United States Patent
Kravitz

(10) Patent No.: US 7,590,475 B2
(45) Date of Patent: Sep. 15, 2009

(54) METHOD AND SYSTEM FOR PROVIDING A COVERT WARNING NOTIFICATION OF A HAZARD TO AN AIRCRAFT

(75) Inventor: Arnold Kravitz, Hollis, NH (US)

(73) Assignee: BAE Systems Information And Electronic Systems Integration Inc., Nashua, NH (US)

( * ) Notice: Subject to any disclaimer, the term of this patent is extended or adjusted under 35 U.S.C. 154(b) by 407 days.

(21) Appl. No.: 10/591,073

(22) PCT Filed: Dec. 23, 2004

(86) PCT No.: PCT/US2004/043741

§ 371 (c)(1),
(2), (4) Date: Aug. 29, 2006

(87) PCT Pub. No.: WO2005/121701

PCT Pub. Date: Dec. 22, 2005

(65) Prior Publication Data

US 2007/0179687 A1 Aug. 2, 2007

Related U.S. Application Data

(60) Provisional application No. 60/576,660, filed on Jun. 3, 2004.

(51) Int. Cl.
*G08G 5/00* (2006.01)
(52) U.S. Cl. .............................. 701/9; 342/36; 342/176; 342/186; 342/373; 340/901
(58) Field of Classification Search ...................... 701/9; 342/33, 36, 37, 175, 176, 186, 373; 340/901; *G08G 5/00*
See application file for complete search history.

(56) References Cited

U.S. PATENT DOCUMENTS

| 5,229,776 | A | * | 7/1993 | Kelly et al. .................. 342/173 |
| 5,493,309 | A | * | 2/1996 | Bjornholt ..................... 342/455 |
| 5,619,206 | A | * | 4/1997 | Cole et al. .................... 342/37 |
| 5,657,009 | A | * | 8/1997 | Gordon ....................... 340/968 |
| 6,002,707 | A | | 12/1999 | Thue |
| 6,178,391 | B1 | * | 1/2001 | Anderson et al. .............. 703/1 |

(Continued)

FOREIGN PATENT DOCUMENTS

EP 0 822 679 A2 2/1998

(Continued)

*Primary Examiner*—Tuan C To
(74) *Attorney, Agent, or Firm*—Hayes Soloway PC; Todd A. Sullivan; Daniel J. Long

(57) ABSTRACT

A system and method for providing a covert warning notification of a hazard to an aircraft is provided. Generally, the system contains a detection system capable of detecting the hazard, and a transceiver capable of allowing the system to provide the covert warning to a location external from the aircraft. A memory and a processor are also provided within the system, where the processor is configured by the memory to perform the steps of: determining a category of radar system associated with a received signal; determining a modulation scheme, based on the determined category of radar system, for displaying an array of icons on the location external from the aircraft, the array of icons providing the covert warning; and using the received signal to provide the array of icons.

7 Claims, 6 Drawing Sheets

U.S. PATENT DOCUMENTS

| | | | |
|---|---|---|---|
| 6,181,261 B1 * | 1/2001 | Miles et al. | 340/971 |
| 7,493,086 B2 * | 2/2009 | Landry et al. | 455/41.3 |
| 2002/0042673 A1 * | 4/2002 | Ooga | 701/120 |
| 2002/0109625 A1 * | 8/2002 | Gouvary | 342/29 |
| 2003/0001770 A1 * | 1/2003 | Cornell et al. | 342/26 |
| 2003/0009278 A1 * | 1/2003 | Mallet et al. | 701/120 |
| 2003/0074128 A1 * | 4/2003 | Mardirossian | 701/120 |
| 2005/0206551 A1 * | 9/2005 | Komiak et al. | 342/42 |

FOREIGN PATENT DOCUMENTS

| | | |
|---|---|---|
| WO | WO 01/65276 A1 | 9/2001 |

* cited by examiner

METHOD AND SYSTEM FOR PROVIDING A COVERT WARNING NOTIFICATION OF A HAZARD TO AN AIRCRAFT

CROSS-REFERENCE TO RELATED APPLICATION

This application claims priority to copending U.S. Provisional Application entitled, "Method And System For Providing A Covert Warning Notification Of A Hazard To An Aircraft," having Ser. No. 60/576,660, filed Jun. 3, 2004, which is entirely incorporated herein by reference.

FIELD OF THE INVENTION

The present invention is generally related to air traffic control, and more particularly is related to methods and systems for air traffic control that provide covert warnings or notification of hazards to an aircraft.

BACKGROUND OF THE INVENTION

Recently there has been an increased interested in protecting commercial aircraft from attacks carried out by means of a class of shoulder fired ground to air missile system known as a Man Portable Air Defense System (MANPADS). It is believed that the vulnerability of commercial aircraft to such systems may be greatest when such aircraft are at relatively lower altitudes (e.g., 10,000 feet), which most often occurs during take off and landing sequences.

During such take off and landing sequences, if an aircraft becomes aware of such a threat, the aircraft typically automatically launches countermeasures. It is desirable for the aircraft to also inform an air traffic controller of the threat. Typically, when an aircraft notifies the air traffic controller of any threat, the notification is not covert, but instead, a verbal communication, thereby causing panic and allowing those who caused the threat to test the countermeasure system of the aircraft for blind spots by triggering false alarms and monitoring communication channels for data.

Unfortunately, cost for modification prohibits modification of systems used by air traffic controllers for communication with the aircraft for purposes of communicating with the aircraft in a non-verbal manner. In addition, at different locations there are many different types of systems used by air traffic controllers for communication with aircrafts regarding threats. Therefore, it would be difficult and expensive to modify each of the systems used by air traffic controllers for purposes of allowing aircrafts to communicate non-verbally with the air traffic controllers.

Thus, a heretofore unaddressed need exists in the industry to address the aforementioned deficiencies and inadequacies.

SUMMARY OF THE INVENTION

Embodiments of the present invention provide a method and system for providing a covert warning notification of a hazard to an aircraft. Briefly described, in architecture, one embodiment of the system, among others, can be implemented as follows. The system contains a detection system capable of detecting the hazard, and a transceiver capable of allowing the system to provide the covert warning to a location external from the aircraft. A memory and a processor are also provided within the system, where the processor is configured by the memory to perform the steps of: determining a category of radar system associated with a received signal; determining a modulation scheme, based on the determined category of radar system, for displaying an array of icons on the location external from the aircraft, the array of icons providing the covert warning; and using the received signal to provide the array of icons.

The present invention, can also be viewed as providing methods for providing a covert warning notification of a hazard to an aircraft. In this regard, one embodiment of such a method, among others, can be broadly summarized by the following steps: receiving a signal from a radar system; determining a category of the radar system by analyzing a waveform associated with the received signal; storing the waveform; determining a modulation scheme for providing the covert warning notification to the radar system, wherein the modulation scheme is based on the analyzed waveform; and transmitting the stored waveform and identification of the aircraft to the radar system.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

It should be noted that while the present description describes methods and systems for providing a covert warning notification of a hazard to an aircraft to an air traffic control (ATC) radar, the present methods and systems may also be used by an aircraft to communicate a message to the ATC radar where the message is not a warning notification of a hazard to an aircraft. In fact, as long as a person reading a display provided by the ATC radar is informed how to interpret a modulation technique used by the present methods and systems, the message associated with the notification from the aircraft may be any message. As an example, the message may instead inform the ATC radar that an important passenger is on the aircraft and security should be alerted, or that fuel is low on an aircraft. It is important to note, however, that the ATC radar, which is used to communicate with aircrafts, is not modified if the present system is provided on aircrafts.

Figure 1:
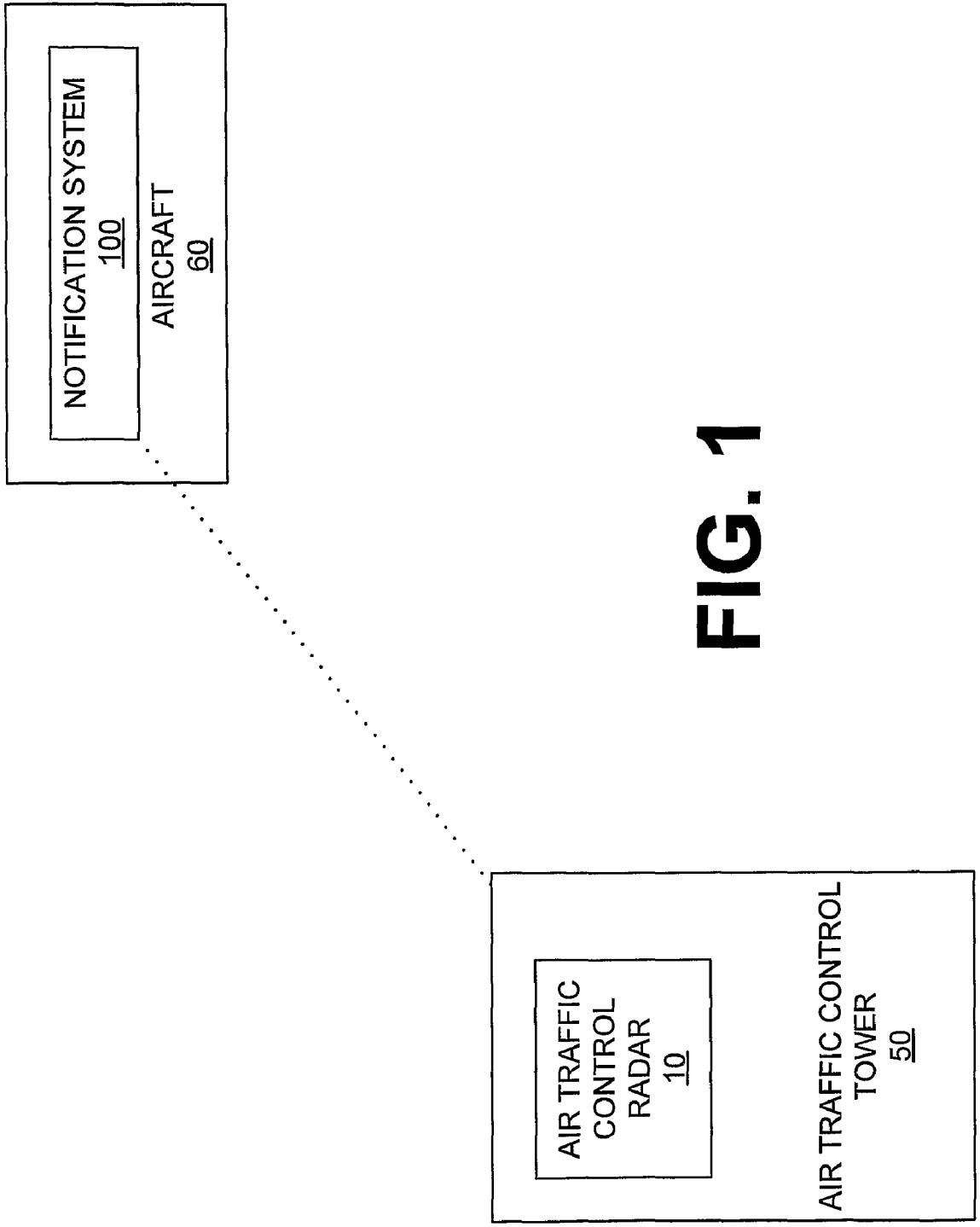
FIG. 1 is a schematic diagram illustrating an example of an environment in which the present system may be provided.

FIG. 1 is a schematic diagram illustrating an example of an environment in which the present system may be provided. As is shown by FIG. 1, an air traffic control (ATC) radar 10 is located within an ATC tower 50. It should be noted that the ATC radar 10 is shown as being located within the ATC tower 50 for exemplary purposes. Instead, the ATC radar 10 may be located at a different location, as long as an aircraft 60 is capable of communicating with the ATC radar 10. It should be noted that the ATC radar 10 may be a secondary radar system such as an identification friend or foe system.

The aircraft 60 has a notification system 100 located thereon, which is capable of communicating with the ATC radar 10. Communication between the notification system 100 and the ATC radar 10 may be provided via numerous methods such as, but not limited to, use of a high instantaneous bandwidth Radio Frequency data communication link capable of generating and receiving ATC radar 10 wave forms (operating frequency, pulse rate frequency, and pulse rate interval), between the notification system 100 and the ATC radar 10. Further description of communication between the notification system 100 and the ATC radar 10 is provided herein.

Figure 2:
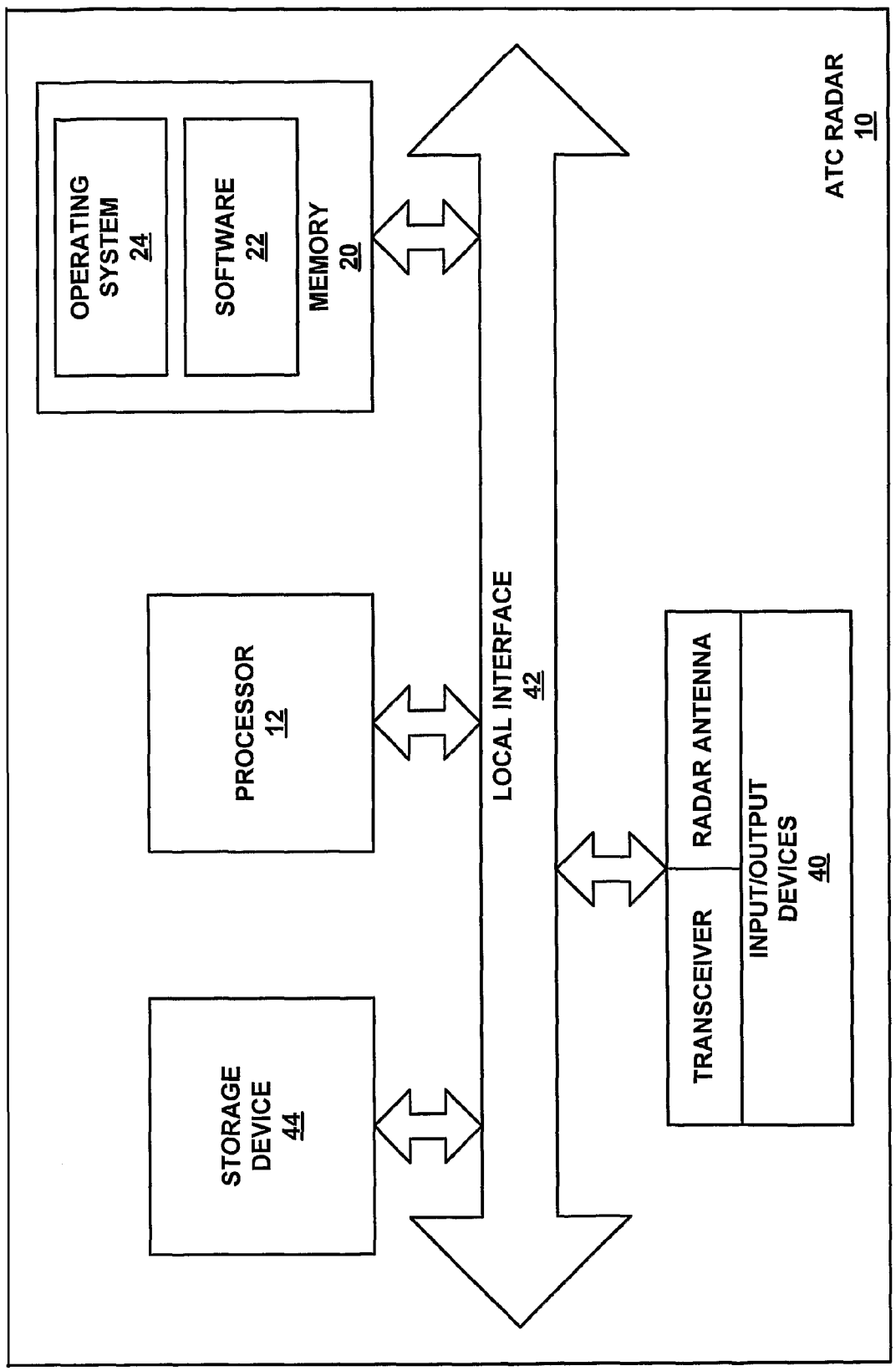
FIG. 2 is a block diagram further illustrating the ATC radar of FIG. 1.

FIG. 2 is a block diagram further illustrating the ATC radar 10 of FIG. 1. The ATC radar 10 can be implemented in a combination of software (e.g., firmware), and hardware. In the currently contemplated best mode, the ATC radar 10 is implemented partially in hardware and partially in software, as an executable program, and is executed by a special or general purpose digital computer, such as a combination of personal computers (PC; IBM-compatible, Apple-compatible, or otherwise), workstations, minicomputers, or mainframe computers. FIG. 2 illustrates the ATC radar 10 as a general purpose computer that can perform functions of the ATC radar 10 as defined herein.

Generally, in terms of hardware architecture, as shown in FIG. 2, the ATC radar 10 includes a processor 12, a memory 20, and one or more input and/or output (I/O) devices 40 (or peripherals) that are communicatively coupled via a local interface 42. The local interface 42 can be, for example but not limited to, one or more buses or other wired or wireless connections, as is known in the art. The local interface 42 may have additional elements, which are omitted for simplicity, such as controllers, buffers (caches), drivers, repeaters, and receivers, to enable communications. Further, the local interface 42 may include address, control, and/or data connections to enable appropriate communications among the aforementioned components.

The ATC radar 10 may also contain a storage device 44 for storing data therein. As an example, in accordance with the first exemplary embodiment of the invention, the data may include identifications of aircrafts with which the ATC radar 10 has communicated. Of course, other information regarding the aircrafts may also be stored within the storage device 44 such as, but not limited to, characteristics of the aircrafts (e.g., RCS, allowable speeds as a function of altitude, return waveform characteristics). This information may be reviewed by the ATC radar 10 from an aircraft 60, during communication with the aircraft 60. Further discussion of this data, in addition to the process of using such data, is further discussed herein.

The processor 12 is a hardware device for executing software 22, particularly that stored in the memory 20. The processor 12 can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 20 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 20 may incorporate electronic, magnetic, optical, and/or other types of storage media. Note that the memory 20 can have a distributed architecture, where various components are situated remote from one another, but can be accessed by the processor 12.

The software 22 in the memory 20 may include one or more separate programs, each of which comprises an ordered listing of executable instructions for implementing logical functions. In the example of FIG. 2, the software 22 in the memory 20 defines the functionality performed by the ATC radar 10. A suitable operating system (O/S) 24 may also be stored within the memory 20. A nonexhaustive list of examples of suitable commercially available operating systems 24 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 24 essentially controls the execution of other computer programs, such as that defined by the software 22 of the ATC radar 10, and provides scheduling, input-output control, file and data management, memory management, and communication control and related services.

The I/O devices 40 may include input devices, for example but not limited to, a keyboard, mouse, scanner, microphone, or other input devices. Furthermore, the I/O devices 140 may also include output devices, for example but not limited to, a printer, display, or other output devices. It should be noted that a device for displaying a received modulation technique is required in accordance with the first exemplary embodiment of the invention, for purposes of displaying a selected modulation technique of the notification system 100 (explained further herein). The I/O devices 40 may further include devices that communicate as both inputs and outputs, for instance but not limited to, a modulator/demodulator (modem; for accessing another device, system, or network), a radio frequency (RF) or other transceiver, a telephonic interface, a bridge, a router, or other communication devices. Specifically, the ATC radar 10 contains a transceiver capable of transmitting to, and receiving from, the aircraft being tracked. In accordance with the first exemplary embodiment of the invention, the transceiver is capable of generating and receiving the ATC radar 10 waveforms (operating frequency, pulse rate frequency, and pulse rate interval).

The I/O devices 40 also include a radar antenna that is capable of detecting an aircraft within a predefined range of the ATC radar 10. As is known by those having ordinary skill in the art, a radar antenna is capable of focusing, directing, and concentrating electromagnetic energy within a specific area. Preferably, the radar antenna is capable of sweeping a specific area and illuminating an aircraft within the specific area in accordance with a predefined signal transmission timing scheme. Sweeping is performed by transmitting a sweeping signal, having a specific waveform, that is capable of reflecting off of the aircraft and back to the ATC radar 10 for analysis. The radar antenna continues to rotate, thereby resulting in a full 360 degree sweep of the specific area.

When the ATC radar 10 is in operation, the processor 12 is configured to execute the software 22 stored within the memory 20, to communicate data to and from the memory 20, and to generally control operations of the ATC radar 10 pursuant to the software 22, as defined herein. The software 22 and the O/S 24, in whole or in part, but typically the latter, are read by the processor 12, perhaps buffered within the processor 12, and then executed.

When the ATC radar 10 is implemented in software, it should be noted that the ATC radar 10 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The ATC radar 10 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the ATC radar 10 is implemented in hardware, the ATC radar 10 can be implemented with any or a combination of the following technologies, which are each well known in the art: a discrete logic circuit(s) having logic gates for implementing logic functions upon data signals; an application specific integrated circuit (ASIC) having appropriate combinational logic gates; a programmable gate array(s) (PGA); and a field programmable gate array (FPGA), among others.

Figure 3:
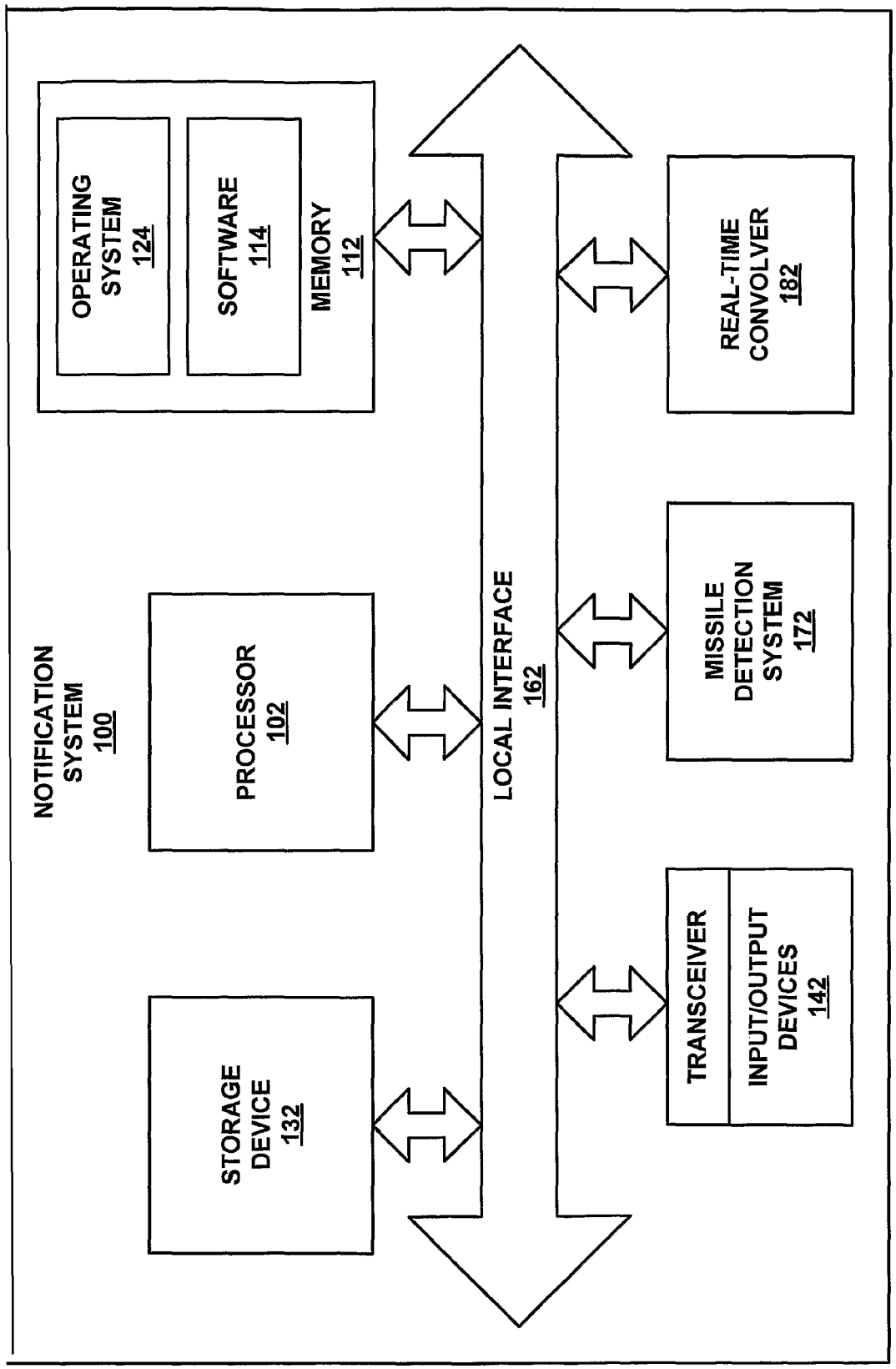
FIG. 3 is a block diagram further illustrating the notification system of FIG. 1.

The notification system 100 of FIG. 1 has a structure that is similar to the structure of the ATC radar 10 of FIG. 2. FIG. 3 is a block diagram further illustrating the notification system 100 of FIG. 1. It should be noted that in addition to the functionality described herein, the notification system 100 is capable of performing functions generally know to be performed by an aircraft transponder, such as, but not limited to, providing identification of the aircraft 60. As is shown by FIG. 3, the notification system 100 contains a processor 102, a memory 112 having software 114 and an operating system 124 therein, a storage device 132, I/O devices 142 of which at least one of the I/O devices 142 is a transceiver, and a local interface 162. The transceiver is capable of transmitting and receiving signals from and to the ATC radar 10. In accordance with the first exemplary embodiment of the invention, the transceiver is capable of high speed, high bandwidth data communication with the ATC radar 10. Each device located within the notification system 100 works in a manner similar to that of devices within the ATC radar 10. Differences between similar devices located within the notification system 100 and the ATC radar 10 include functionality defined by the software 114, as defined hereafter, and data stored within the storage device 132, as defined hereafter.

The notification system 100 also contains a missile detection system 172 that is capable of detecting a missile threat prior to infliction of damage by the missile. The missile detection system 172 may be one of many different missile detection systems known to those having ordinary skill in the art. As an example, the missile detection system 172 may be a BAE Counter MANPADS system, by BAE Systems of Rockville, Md. It should be noted that in accordance with an alternative embodiment of the invention, the missile detection system 172 is replaced by an interface to a separately located missile detection system.

The notification system 100 also contains a real-time convolver 182 that is capable of performing real-time convolution, as is described in detail herein. As an example, the real-time colvolver 182 may be based on field programmable gate arrays to perform convolution operations. Since one having ordinary skill in the art would know how a real-time convolver works, further discussion of the real-time convolver 182 is not provided herein.

The storage device 132 located within the notification system 100 stores an identification of the ATC radar 10, where the identification of the ATC radar 10 is capable of being used by the notification system 100 to determine a source of a signal transmission received by the notification system 100. The storage device 132 is also capable of storing a waveform received from the ATC radar 10. If the storage device 132 is capable of storing a received waveform, the storage device 132 may be a digital storage device capable of storing such waveforms. With each stored waveform is also stored a classification of radar system and signal transmission timing information signifying when the radar system transmits radar signals (i.e., sweeping signals). Having the signal transmission timing interval information stored within the storage device 132 of the notification system 100 allows the notification system 100 to determine when a second sweeping signal will be received by the notification system 100. Use of the signal transmission timing interval is described in detail herein with regard to FIG. 4, FIG. 5, FIG. 6. Transmission of signals between the ATC radar 10 and the notification system 100, in addition to use of the signals, and information transmitted therein, is described in further detail herein.

It should be noted that the notification system 100 has the capability going into a sleep mode, where power to portions of the notification system 100 is decreased or turned off. As an example, a transmission portion of the notification system 100 may be turned off or have power to the portion decreased so the notification system 100 is only capable of receiving a signal and determining if the signal is from the ATC radar 10 by examining the waveform of the received signal. As is explained in detail below, if the notification system 100 determines that the received waveform is from the ATC radar 10, the notification system 100 is capable of coming out of sleep mode and allowing full power to be received by all portions of the notification system 100.

Figure 4:
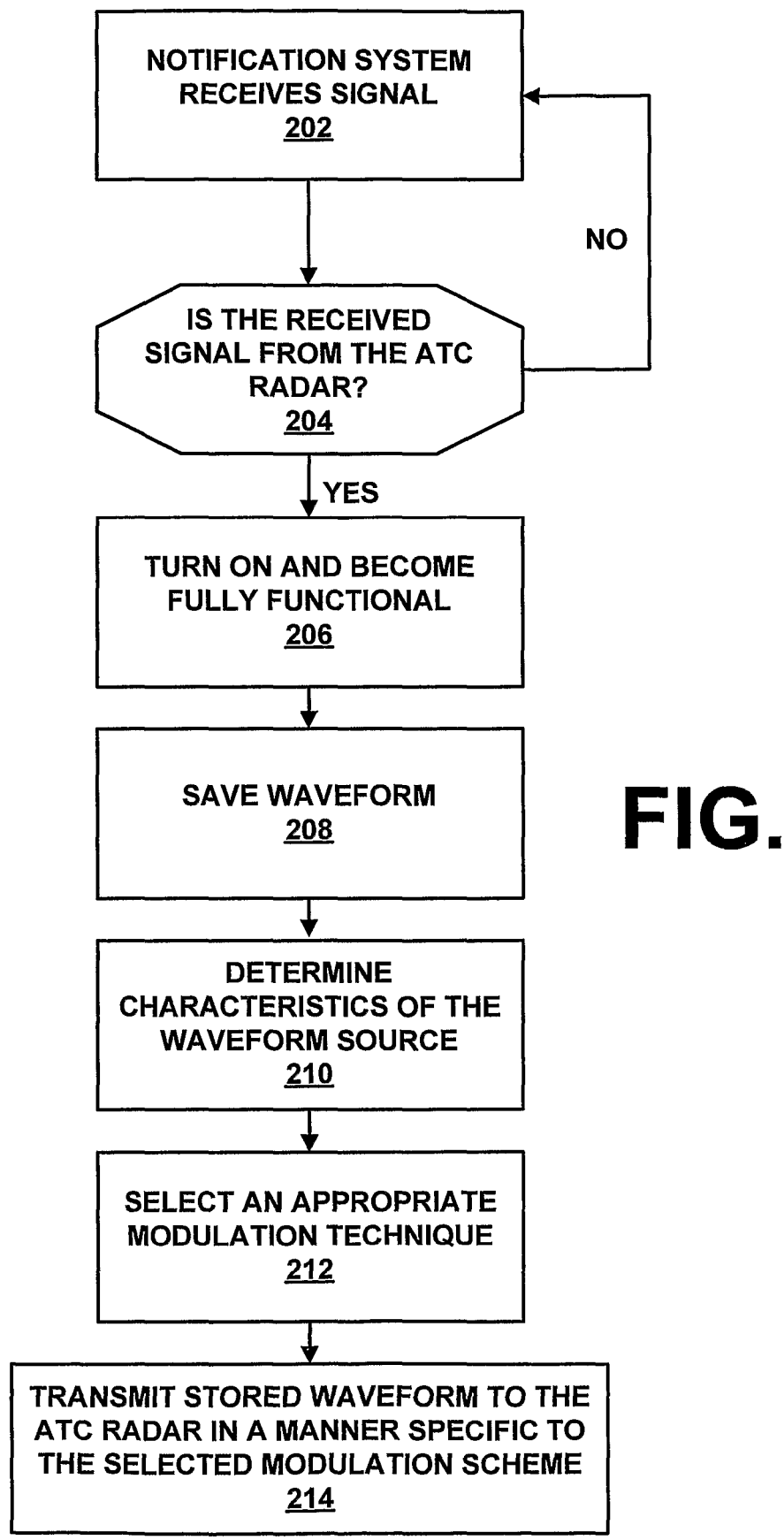
FIG. 4 is a flowchart illustrating steps taken in providing the ATC radar with a covert warning.

FIG. 4 is a flowchart 200 illustrating steps taken in providing the ATC radar 10 with a covert warning. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, the notification system 100 receives a signal. The notification system 100 then examines the waveform of the received signal to determine if the received waveform belongs to the ATC radar 10 (i.e., a ground radar system) (block 204). To determine if the received waveform belongs to the ATC radar 10, the notification system 100 analyzes characteristics of the received waveform. As an example, the notification system 100 may determine pulse rate frequency (PRF) and pulse rate interval (PRI) of the received waveform. By having stored within the storage device 132 ranges of PRFs and PRIs that are associated with the ATC radar 10, the notification system 100 is capable of determining if the received waveform is from the ATC radar 10.

If the received waveform does not belong to the ATC radar 10, the notification system 100 does nothing. Instead, the notification system 100 continues to receive signals and analyzes the waveform of the signals to determine if the signal is received from the ATC radar 10.

If the signal is confirmed to be received from the ATC radar 10, the notification system 100 fully powers up (block 206). As has been mentioned herein, the notification system 100 is capable of going into a sleep mode where select portions of the notification system 100 receive power or receive reduced amounts of power. By decreasing power to, or turning off power to, select portions of the notification system 100 power is conserved in the aircraft 60. In addition, it is known that certain electronic devices have an expected lifetime until there is a possibility of their failure. Since the notification system 100 is located on an aircraft 60 it is beneficial to have such electronic devices last as long as possible before failure. Such conservation decreases costs associated with maintaining the aircraft 60 and minimizes chances of the notification system 100 failing while the aircraft 60 is in transit.

The received waveform is also saved within the storage device 132 of the notification system 100 (block 208). Specifically, it is preferred that the received waveform is stored in a digital format. Alternatively, a delay device may be used for maintaining the received waveform for a predefined period of time prior to transmission of the received waveform back to the ATC radar 10, as is explained in detail herein. As example of such a delay device may be an elongated portion of optical fiber.

The received waveform is then analyzed in detail to determine more specific characteristics of the radar system associated with the received waveform (i.e., the ATC radar 10) (block 210). Specifically, the received waveform is compared to waveforms previously stored within the storage device 132 of the notification system 100, to determine the classification of the ATC radar 10 and other characteristics of the ATC radar 10. By determining the classification of the ATC radar 10, signal transmission timing information of the ATC radar 10 may be determined. Specifically, by searching for the received waveform within the storage device 132, the classification of the ATC radar 10 and signal transmission timing information of the ATC radar 10 may be determined, thereby allowing the notification system 100 to know when the next sweeping signal (i.e., signal transmission) or alternatively the next pulse train in the wave form or next pulse in the pulse train, will be received by the ATC radar 10. In addition, by knowing the signal transmission timing information, the notification system 100 is also capable of determining when a return to the received sweeping signal is expected by the ATC radar 10 (referred to herein as the "required identification time"). Such a return may include identification of the aircraft and other information regarding the aircraft 60, such as, but not limited to, range, speed, altitude, approach vector, horizontal elevation, azimuth northing, and time of detection. In addition, the aircraft 60 use transponders, not shown, to send messages to the ground network containing the ATC radar 10 which identify the aircraft 60, its location and time. When the ATC radar 10 return correlates in position and time with the transponder message then the ATC radar 10 displays an Icon representing the aircraft and information identifying it.

After a detailed analysis of the received waveform has been performed (block 212), and the signal transmission timing information is known, an appropriate modulation technique is selected by the notification system 100 (block 212). The selected modulation technique is used by the notification system 100 to display a specific icon arrangement on the ATC radar 10 (i.e., a screen of the ATC radar 10), where the icon arrangement will be recognized by a viewer of the display as a covert warning notification from the aircraft 60. Of course a different I/O device 140 of the ATC radar 10 may be used for displaying the icon arrangement, such as, but not limited to, a printer.

The notification system 100 then transmits the stored waveform to the ATC radar 10 in a manner specific to the selected modulation scheme (block 214), thereby providing for display of the specific icon arrangement on the ATC radar 10. An example of the icon arrangement is provided by FIG. 5. In addition, FIG. 6 is a flowchart 400 illustrating creation of the icon arrangement of FIG. 5, while the description of FIG. 6 describes the manner of transmitting the stored waveform to the ATC radar 10 in a manner appropriate to form the selected modulation scheme. It should be noted that a different modulation scheme may be provided.

Figure 5:
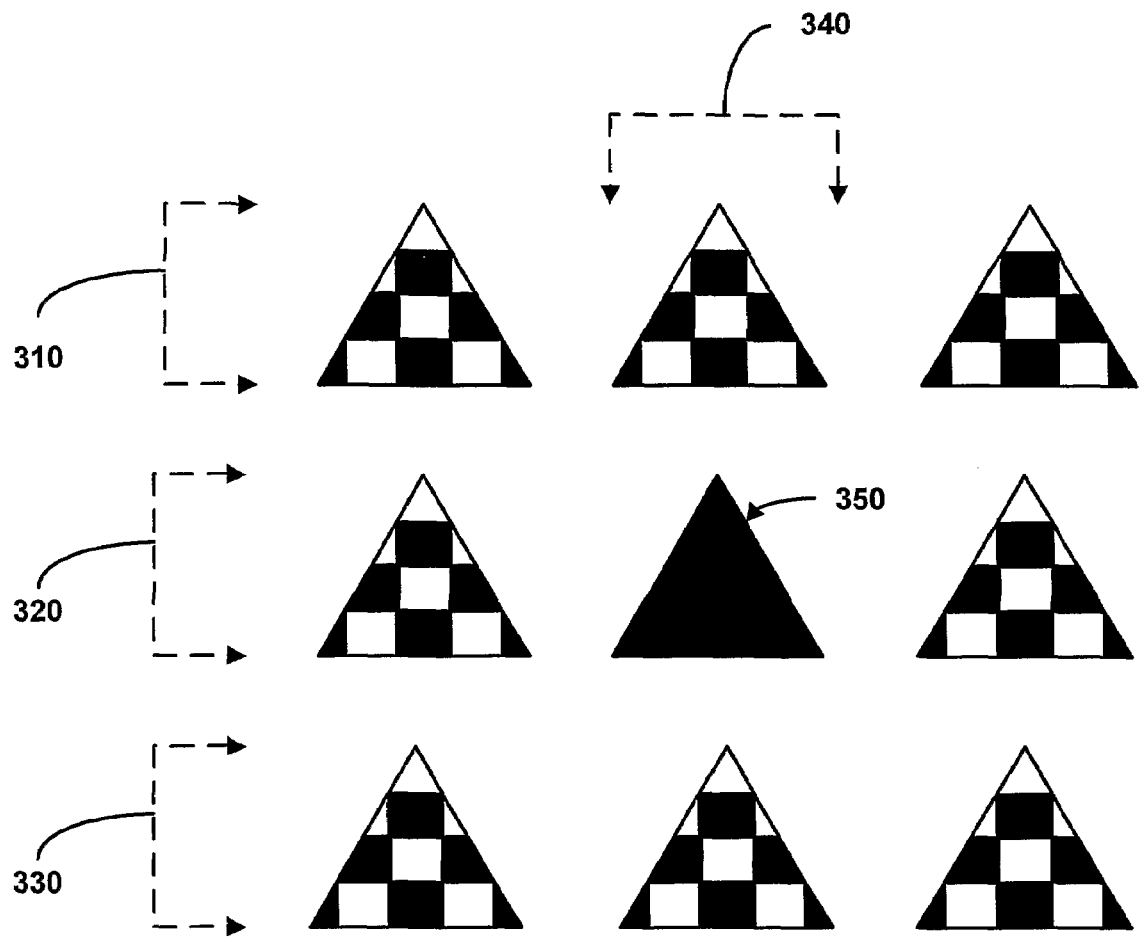
FIG. 5 is a schematic diagram providing an example of an icon arrangement created by a modulation scheme selected by the notification system of FIG. 1.
Figure 6:
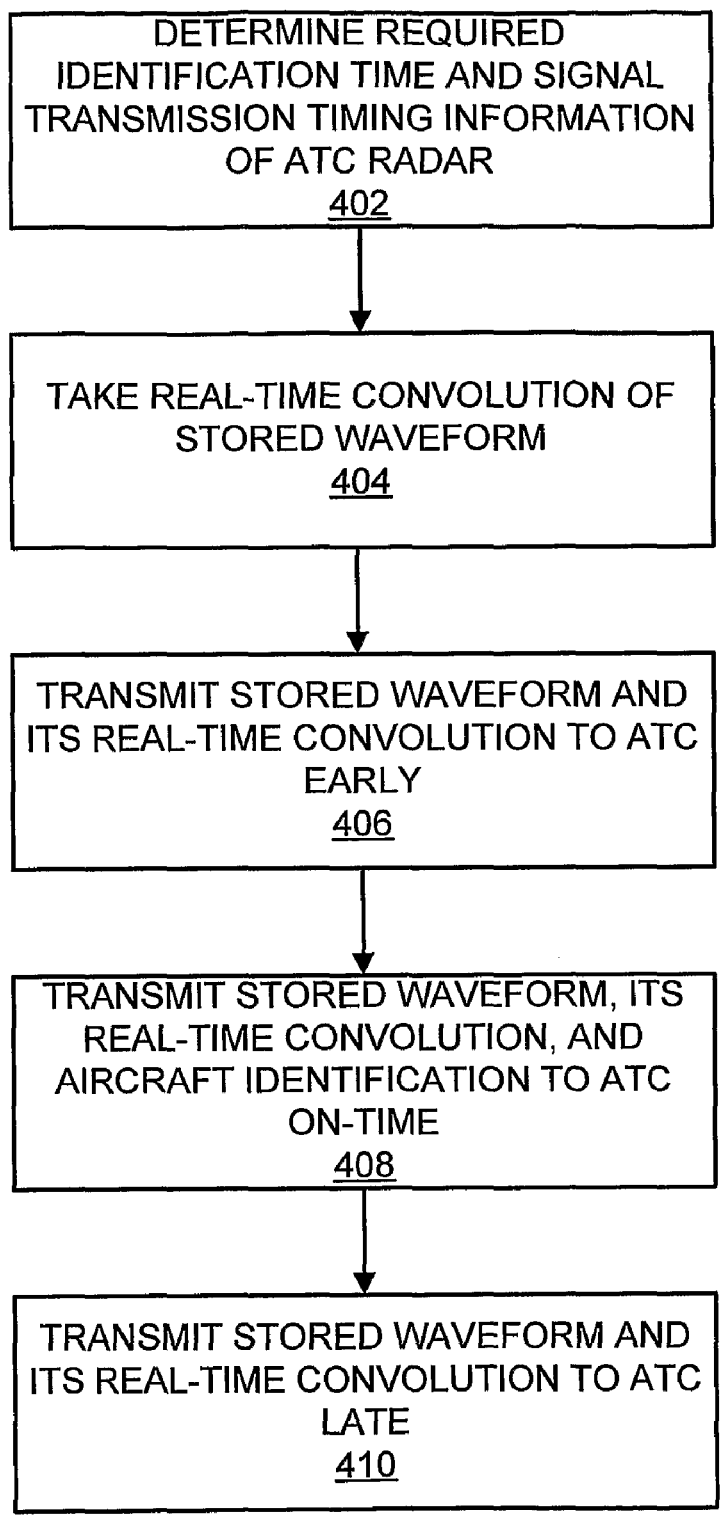
FIG. 6 is a flowchart illustrating creation of the icon arrangement of FIG. 5

Referring to both FIG. 5 and FIG. 6, the icon display 300 of FIG. 5 shows three horizontal rows. As will be described in detail herein, the first horizontal row 310 is referred to herein as an early rebroadcast representation, the second horizontal row 320 is referred to herein as an on-time rebroadcast representation, and the third horizontal row 330 is referred to herein as a late rebroadcast representation. Each icon, represented herein as a triangle, although it should be noted that different shaped icons may be used instead of a triangular shaped icon, is either a checkered icon or an entirely darkened icon.

Looking at a central column 340 of the icon display, as is explained in detail below, the entirely darkened icon 340 represents the aircraft 60 when the ATC radar 10 has received both the stored waveform from the notification system 100 and identification of the aircraft 60, where the stored waveform and the identification of the aircraft 60 was transmitted by the notification system 60 in accordance with the time required for response to a second sweeping signal, by the ATC radar 10 (also referred herein to as the "required identification time"). As mentioned above, the notification system 100 is capable of performing functions similar to an aircraft transponder. By knowing the signal transmission timing information of the ATC radar 10 associated with the stored waveform, the notification system 100 knows when the next sweeping signal will be transmitted by the ATC radar 10. Therefore, the entirely darkened icon 340 is a result of the notification system 100 transmitting identification of the aircraft 60 and the stored waveform from the notification system 100 within the required identification time of receiving the second sweeping signal.

Alternatively, still referring to the central column 340, the partially filled icon in the first horizontal row 310 represents an instance when the ATC radar 10 received the stored waveform from the notification system 100 prior to the ATC radar 10 sending out the second sweeping signal. As has been mentioned above, the first sweeping signal was the first signal received by the notification system 100. The partially filled icon in the third horizontal row 330 represents an instance when the ATC radar 10 received the stored waveform from the notification system 100 after the ATC radar 10 sent out the second sweeping signal, yet not within the required identification time of receiving the second sweeping signal. It should be noted that the partially filled icons in the central column are caused because identification of the aircraft has not been received with the stored waveform.

Other partially filled icons are provided by transmitting the real-time convolution of the stored waveform with the stored waveform itself. As an example, before the step of the notification system 100 transmitting the stored waveform prior to receiving the second sweeping signal, the real-time convolution of the stored waveform is taken. Thereafter, and still prior to receiving the second sweeping signal, the stored waveform and its real-time convolution are transmitted to the ATC radar 10. The result of the early transmission by the notification system 100 is the ATC radar 10 displaying the first horizontal row 310, where the icons to the left and right of the central column 340 icon are the real-time convolutions of the stored waveform, and where the central column 340 icon is the actual rendition of the stored waveform received by the ATC radar 10.

As a further example, before the step of the notification system 100 transmitting the stored waveform after the ATC radar 10 sent out the second sweeping signal, yet not within the required identification time of receiving the second sweeping signal, the real-time convolution of the stored waveform is taken. Thereafter, and still after the required identification time of receiving the second sweeping signal, the stored waveform and its real-time convolution are transmitted to the ATC radar 10. The result of the late transmission by the notification system 100 is the ATC radar 10 displaying the third horizontal row 330, where the icons to the left and right of the central column 340 icon are the real-time convolutions of the stored waveform, and where the central column 340 icon is the actual rendition of the re-broadcasted waveform.

Finally, with regard to the partially filled icons in the second horizontal row 320, before the step of the notification system 100 transmitting the stored waveform and the identification of the aircraft 60 within the required identification time of receiving the second sweeping signal, the real-time convolution of the stored waveform is taken. Thereafter, and still during the required identification time of receiving the second sweeping signal from the ATC radar 10, the stored waveform, its real-time convolution, and the identification of the aircraft 60 are transmitted to the ATC radar 10. The result of the on-time transmission by the notification system 100 is the ATC radar 10 displaying the second horizontal row 320, where the icons to the left and right of the central column 350 icon are the real-time convolutions of the stored waveform, and where the central column 350 icon is the actual rendition of the re-broadcasted waveform and the identification of the aircraft 60. FIG. 6 further illustrates the above-mentioned process of providing the icon display of FIG. 5 in accordance with the selected modulation scheme of the ATC radar 10.

Referring to FIG. 6 and FIG. 5, to display the specific icon arrangement on the ATC radar 10, the required identification time of the ATC radar 10 and the signal transmission timing information of the ATC radar 10 is determined (block 402). The real-time convolution of the stored waveform is taken (block 404). Knowing the required identification time of the ATC radar 10 and the signal transmission timing information of the ATC radar 10 the stored waveform and its real-time convolution is transmitted from the notification system 100 to the ATC radar 10 as follows.

As is shown by block 406, the stored waveform and its real-time convolution are transmitted to the ATC radar 10 prior to the notification system 10 receiving the second sweeping signal. The result of the early transmission by the notification system 100 is the ATC radar 10 displaying the first horizontal row 310 of FIG. 5, where the icons to the left and right of the central column 340 icon are the real-time convolutions of the stored waveform, and where the central column 340 icon is the actual rendition of the stored waveform received by the ATC radar 10.

As is shown by block 408 of FIG. 6, the stored waveform, its real-time convolution, and the aircraft identification are transmitted to the ATC radar 10 during the required identification time of receiving the second sweeping signal from the ATC radar 10. The result of the on-time transmission by the notification system 100 is the ATC radar 10 displaying the second horizontal row 320 of FIG. 5, where the icons to the left and right of the central column 350 icon are the real-time convolutions of the stored waveform, and where the central column 350 icon is the actual rendition of the re-broadcasted waveform and the identification of the aircraft 60.

As is shown by block 410 of FIG. 6, the stored waveform and its real-time convolution are transmitted to the ATC radar 10 after the required identification time of receiving the second sweeping signal. The result of the late transmission by the notification system 100 is the ATC radar 10 displaying the third horizontal row 330 of FIG. 5, where the icons to the left and right of the central column 340 icon are the real-time convolutions of the stored waveform, and where the central column 340 icon is the actual rendition of the re-broadcasted waveform.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for providing a covert warning notification of a hazard to an aircraft, comprising: a detection system capable of detecting said hazard; a transceiver capable of allowing said system to provide said covert warning to a location external from said aircraft; a storage device; a memory; and a processor, configured by said memory to perform the steps of: determining a category of radar system associated with a received signal; determining a modulation scheme, based on said determined category of radar system, for displaying an array of icons on said location external from said aircraft, said array of icons providing said covert warning; and using said received signal to provide said array of icons; and a real-time convolver, wherein said icon display is provided by using said real-time convolver to take a real-time convolution of said received signal and transmitting said received signal and said real-time convolution of said received signal to said location external from said aircraft wherein said 3×3 array of icons is a array of icons.

2. The system of claim 1, wherein said system further comprises a power regulator capable of putting said system in a sleep mode, where portions of said system do not receive full power.

3. The system of claim 1, further comprising a storage device, said storage device being capable of storing said received signal.

4. The system of claim 1, further comprising a delaying device capable of holding said received signal for a predetermined period of time.

5. The system of claim 1, wherein said hazard is a missile launched at said aircraft.

6. The system of claim 1, wherein said location external from said aircraft is a ground radar system.

7. The system of claim 1, wherein determining a category of radar system associated with a received signal comprises analyzing a waveform associated with said received signal.

* * * * *